United States Patent
Hossam et al.

(10) Patent No.: US 11,176,309 B1
(45) Date of Patent: Nov. 16, 2021

(54) SYSTEM AND METHOD FOR VALIDATION OF PHOTONICS DEVICE LAYOUT DESIGNS

(71) Applicant: Mentor Graphics Corporation, Wilsonville, OR (US)

(72) Inventors: Nermeen Mohamed Hossam, Nasr (EG); Nadine Shehad, Cairo (EG)

(73) Assignee: Siemens Industry Software Inc., Plano, TX (US)

(*) Notice: Subject to any disclaimer, the term of this patent is extended or adjusted under 35 U.S.C. 154(b) by 0 days.

(21) Appl. No.: 16/994,830

(22) Filed: Aug. 17, 2020

(51) Int. Cl.
*G06F 30/30* (2020.01)
*G06F 30/398* (2020.01)
*G06F 30/392* (2020.01)
*G06F 119/18* (2020.01)

(52) U.S. Cl.
CPC .......... *G06F 30/398* (2020.01); *G06F 30/392* (2020.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 8,504,949 B2* | 8/2013 | Robles | .................. | G06F 30/398 716/52 |
| 8,627,240 B1* | 1/2014 | Acar | ..................... | G06F 30/398 716/52 |
| 10,185,799 B2* | 1/2019 | Cao | ........................ | G06F 30/398 |
| 10,444,734 B2* | 10/2019 | Koranne | ................ | G06F 17/175 |
| 10,627,713 B1* | 4/2020 | Jaklic | .................... | G06F 30/398 |

OTHER PUBLICATIONS

Z. Juneidi et al., "Design Rules for Non-Manhattan Shapes," Proc. SPIE 4174, Micromachining and Microfabrication in Process Technology VI, Aug. 25, 2000, pp. 200-206. (Year: 2000).*
R. Cao et al., "Silicon Photonics Design Rule Checking: Application of a Programmable Modeling Engine for Non-Manhattan Geometry Verification," 2014 22nd Int'l Conference on Very Large Scale Integration (VLSI-SoC), IEEE, 6 pages. (Year: 2014).*
R. Cao et al., DRC Challenges and Solutions for Non-Manhattan Layout Designs, 2014 Int'l Conference on optical MEMS and Nanophotonics, IEEE, pp. 175-176. (Year: 2014).*

* cited by examiner

*Primary Examiner* — Leigh M Garbowski

(57) ABSTRACT

Systems and methods for validation of photonics device layout designs. A method includes receiving, by a computer system, a rule deck and a layout design. The layout design includes silicon photonics (SiP) structures. The method includes performing a verification process to produce verification results. The verification results include violations and the violations include SiP violations. The method includes performing SiP spacing filtering to filter the SiP violations into true SiP violations and false SiP violations. The method includes storing the true SiP violations in a result database.

18 Claims, 5 Drawing Sheets

SYSTEM AND METHOD FOR VALIDATION OF PHOTONICS DEVICE LAYOUT DESIGNS

TECHNICAL FIELD

The disclosed technology is directed techniques for design and testing of integrated circuit (IC) chips and layouts. Various implementations of the disclosed technology may be particularly useful for design and testing of IC layouts that include photonic structures.

BACKGROUND OF THE DISCLOSURE

Traditional IC design uses layers of semiconductor and metal materials to conduct electricity and form component devices. The structures used to build these components are typically rectilinear in design, both vertically and horizontally, or skew edges. Actual manufacture, including masking, etching, and doping, may produce less precise structures, making it even more important that the design be properly verified, by processes such as design rule checking (DRC), to ensure that the manufactured structures actually function as designed. Photonic structures can differ by requiring shapes that are not rectilinear and do not work well with conventional design verification processes. Improved systems for design and testing of ICs including photonics structures are desirable.

SUMMARY OF THE DISCLOSURE

Various disclosed embodiments include a method performed by a computer system for validation of photonics device layout designs. A method includes receiving, by a computer system, a rule deck and a layout design. The layout design includes silicon photonics (SiP) structures. The method includes performing a verification process to produce verification results. The verification results include violations and the violations include SiP violations. The method includes performing SiP spacing filtering to filter the SiP violations into true SiP violations and false SiP violations. The method includes storing the true SiP violations in a result database.

In various embodiments, the false SiP violations are stored separately from the true SiP violations. In various embodiments, the verification results are stored in ASCII files or a design-for-manufacturing database. In various embodiments, the rule deck includes spacing checks for SiP layers, but does not include SiP-specific handling for curvature shapes. In various embodiments, the computer system performs the SiP spacing filtering by identifying SiP curved structures in the layout design, measuring spacing values between structures in the layout design, producing adjusted spacing values for the SiP curved structures, comparing the adjusted spacing value to a spacing constraint and filtering the SiP violations into the true SiP violations and the false SiP violations according to the comparison. In various embodiments, measuring spacing values between structures in the layout design is performed at locations corresponding to the SiP violations.

Disclosed embodiments include a computer system having a processor and an accessible memory, configured to perform processes as disclosed herein. Disclosed embodiments include a non-transitory computer-readable medium storing with executable instructions that, when executed, cause one or more computer systems to perform processes as disclosed herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other devices or processes for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
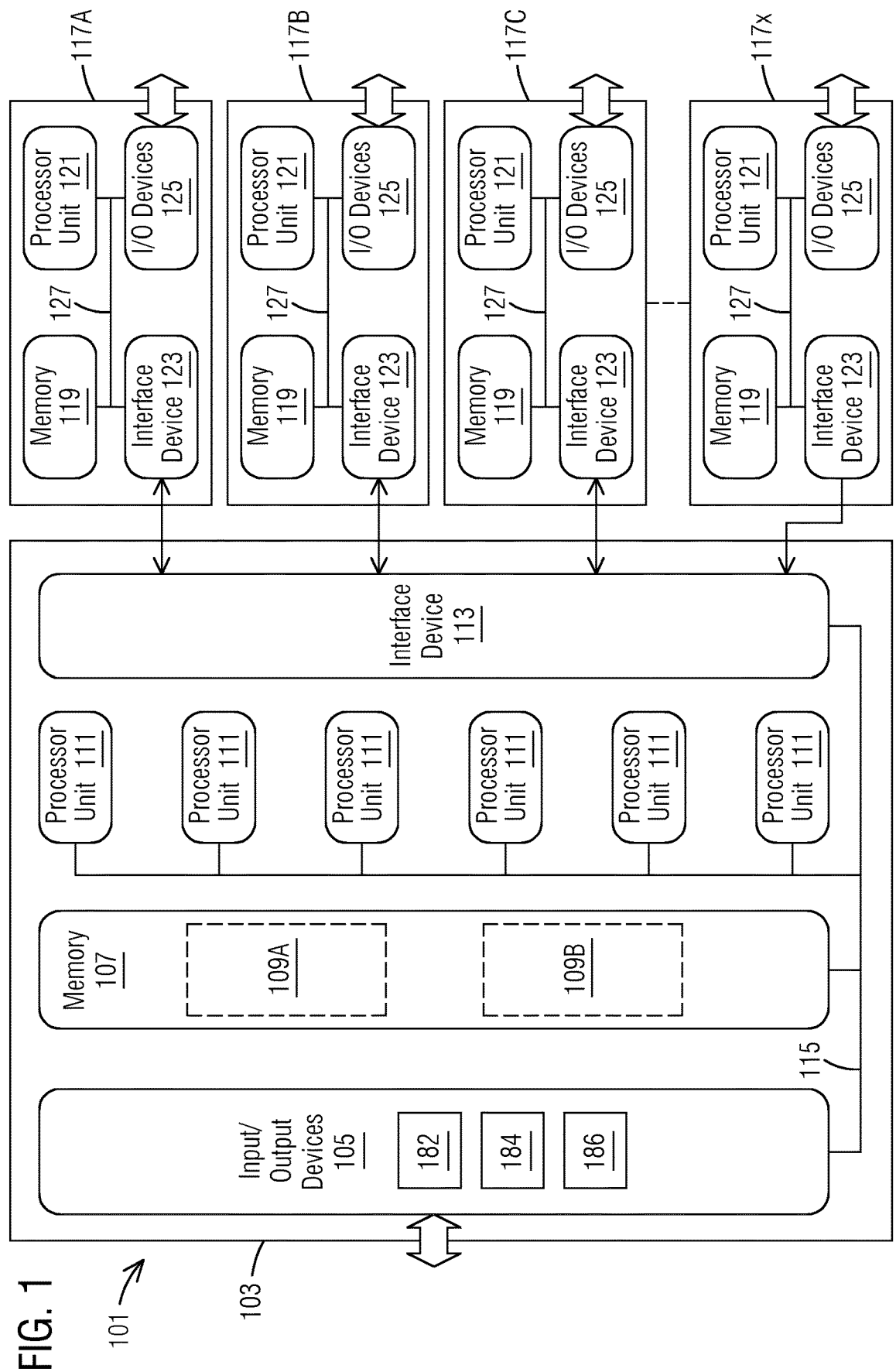
FIGS. 1 and 2 illustrate components of a computer system that may be used to implement various embodiments of the disclosed technology.

The Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

General Considerations

Silicon photonics augments traditional electrical signals in integrated circuits (ICs) with light transmission to speed up data transfer and reduce power consumption.

Traditional IC designs that use rectilinear shapes such as Manhattan polygons which are more common and may also include skew edges. A Manhattan polygon may refer to a 2D polygon in which all vertices are right angles (and so may be referred to as "corners") and is composed of only vertical and horizontal edges, while skew edges also include edges at any angle to one another.

Photonics IC (PIC) designs present a unique set of challenges for physical verification in the design flow. A PIC layout design contains components that require smooth curves to operate efficiently, using curvilinear shapes and special bends to confine, steer and guide light. As a result, PIC designs employ a variety of curvilinear structures such as wave guides, Euler bends, ring filters, etc., known to those of skill in the art. Verifying such non-Manhattan layouts with traditional DRC methods results in a huge number of false errors that are impossible to debug. This growing demand for PICs increases the need for a solid, stable physical verification platform for PIC designs.

Various aspects of the present disclosed technology relate to testing of IC layout designs that include photonic structures, which can include any structures that are useful for manipulating, communicating with, or otherwise using light on the chip. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "partition," and "extract" to describe the disclosed methods. Such terms are high-level descriptions of the actual operations that are performed. The actual operations that correspond to these terms will vary depending on the particular implementation and are readily discernible by one of ordinary skill in the art.

Illustrative Operating Environment

The execution of various processes described herein may be implemented using computer-executable software instructions executed by one or more programmable computing devices. Because these processes may be implemented using software instructions, the components and operation of a generic programmable computer system on which various embodiments of these processes may be employed will first be described. Further, because of the complexity of some electronic design and testing processes and the large size of many circuit designs, various electronic design and testing tools are configured to operate on a computing system capable of simultaneously running multiple processing threads. The components and operation of a computer system having a host or master computer and one or more remote or slave computers therefore will be described with reference to FIG. 1. This operating environment is only one example of a suitable operating environment, however, and is not intended to suggest any limitation as to the scope of use or functionality of any implementations of the invention.

In FIG. 1, the computer system 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other non-transitory storage medium that can be used to store desired information. As used herein, the term "non-transitory" refers to the ability to store information for subsequent retrieval at a desired time, as opposed to propagating electromagnetic signals.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel. Data 109B can also specifically include data related to processes described herein, such as rule deck 182, layout design 184, and databases 186.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
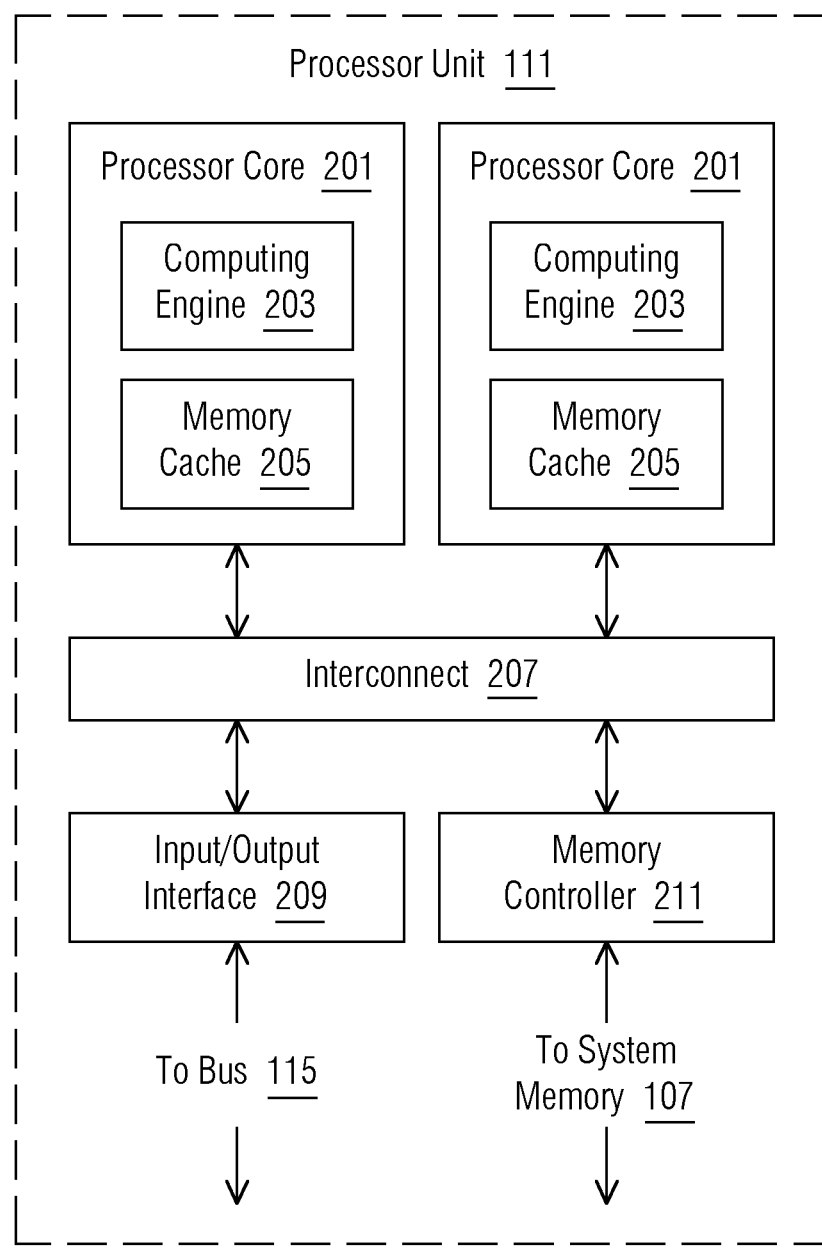

With some implementations of the invention, the master computer 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation, and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. It also should be appreciated that, with some implementations, a multi-core processor unit 111 can be used in lieu of multiple, separate processor units 111. For example, rather than employing six separate processor units 111, an alternate implementation of the computing system 101 may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 123, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel®. Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the technology may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the computer system 101, the master computer 103 may be connected to one or more external data storage devices. These external data storage devices may be implemented using any combination of non-transitory computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the computer system 101, one or more of the slave computers 117 may alternately or additions be connected to one or more external non-transitory data storage devices. Typically, these external non-transitory data storage devices will include data storage devices that also are connected to the master computer 103, but they also may be different from any data storage devices accessible by the master computer 103.

It also should be appreciated that the description of the computer system 101 illustrated in FIG. 1 and FIG. 2 is provided as an example only, and it not intended to suggest any limitation as to the scope of use or functionality of various embodiments of the invention.

Disclosed embodiments include improved systems and methods for design verification of ICs that include PIC structures that address the numerous false errors that can be generated by other DRC or electronic design automation (EDA) tools. EDA tools may attempt to adjust or move curvilinear shapes by translating them into line segments over a grid representing the IC layout design to perform the verification processes, since some EDA tools require points to be aligned with the grid. In doing so, the EDA tool may "snap" the vertices of the line segments onto grid points of the grid, particularly at skew edges. Disclosed embodiments provide a significant improvement in the operation of systems that perform DRC processes by performing a fully-automated process to perform DRC checks while detecting and filtering out false spacing violations related to SiP structures.

In the case of PIC structures, this results in the designed PIC structure curves being moved to a location, for at least the purposes of the verification process, that causes a "violation" error by being too close to another structure, too close to another edge or curve of the same SiP structure, or otherwise in violation of design constraints, even though the PIC structure would not cause a manufacturing or design-rule error in its original location. As a result, in conventional systems, thousands of false violations may be reported, which cannot practically be addressed manually for each of the multitude of structures in the layout design.

DRC processes can be specific to the "foundry" that will manufacture the physical chip from the IC layout design. The "foundry deck" or "DRC deck" refers to a file comprising typically thousands of commands in a proprietary checker language for a specific DRC tool that is used to verify the design to ensure that it will be successfully manufactured at that foundry, taking into account such factors as the spacing between the different edges in the layout, whether of the same or different structures. In advanced technologies such a deck executes tens of thousands of geometric operations on the physical layout design data as it tries to detect violations of the foundry design rules in the layout design.

To overcome that, some embodiments can identify photonics structures and apply complex conditional DRC rules with the necessary tolerance to eliminate the false errors in the curved segments. This approach requires modifying the foundry deck to detect curved edges and then adding the required tolerance while measuring spacing between them. Such a process can be performed on validation process that uses photonics curved structures in a layer, which can be a complex and time-consuming task when designing the foundry deck rules.

Disclosed embodiments improve on this process by achieving similar results without requiring customization of the foundry deck, by instead filtering false violations from actual violations after the DRC process.

Figure 3:
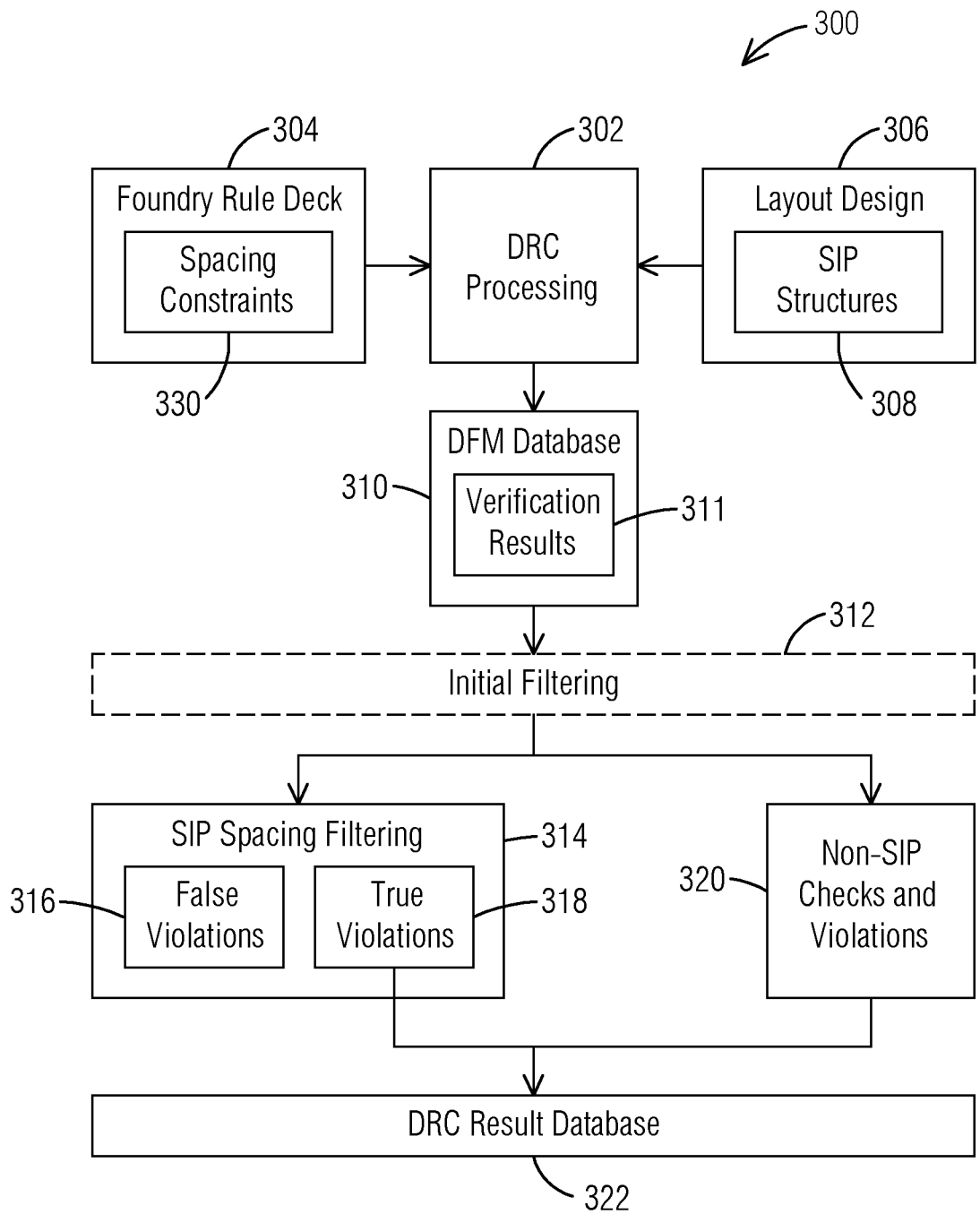
FIG. 3 illustrates a process in accordance with disclosed embodiments that can be performed by one or more computer systems.

FIG. 3 illustrates a process 300 in accordance with disclosed embodiments that can be performed by one or more computer systems such as computer system 101. In this process, a DRC application of the computer system receives as input a rule deck 304 of DRC rules, such as a foundry rule deck, and a layout design 306, which includes SiP structures 308. Note that, in specific embodiments, rule deck 304 does include spacing checks for SiP layers that are used in SiP structures, but does not include any SiP-specific handling for curvature shapes of the SiP structures themselves, so that a standard rule deck can be used with DRC application 302. Rule deck 304 can include spacing constraints 330 as part of the DRC rules. "Receiving," as used herein, can include retrieving from storage, receiving from another device or process, receiving via an interaction with a user, or otherwise.

The DRC application performs its DRC verification processes 302, as known to those of skill in the art, and exports the DRC verification results 311 to an American Standard Code for Information Interchange (ASCII) DRC results file, a design-for-manufacturing (DFM) database 310 (or other database), or other storage that is accessible by the computer system, such as stored in memory as data 109B. The verification results 311 include DRC-detected violations including SiP violations and non-SiP violations, where the SiP violations are violations that correspond to SiP structures. The violations (both SiP violations and non-SiP violations) can include spacing violations of spacing constraints 330. The DRC verification processes can include measuring spacing between different structures in the design layout, and can include separating the SiP structures 308 into linear segments and the measuring spacing between the various segments as described herein.

The computer system can perform initial filtering 312, using the layout design and/or the verification results, to separate SiP violations 316/318 from non-SiP violations 320. In some cases, the SiP violations only include spacing violations related to SiP structures.

The computer system can then pass the non-SiP violations 320 and other checks to a DRC result database 322 that is accessible by the computer system, such as stored in memory as data 109B (and can be combined with DFM database 310).

The computer system then performs SiP spacing filtering 314, as described below, to separate the SiP violations into true SiP violations 318 and false SiP violations 316. The false SiP violations can be, but are not necessarily, discarded, or can be stored for later processing or review. The true SiP violations 318 can be stored with the non-SiP violations 320 and other checks in the DRC result database 322.

In this process, instead of editing the foundry rule deck 304 to add the special operations for each SiP spacing check, a process as described herein can include SiP spacing filtering 314 to automatically filter out the false violations reported on the SiP structures, so that only the true SiP violations 318 get reported in the DRC results database 322. The filtered false SiP violations 316 can be reported in a separate database or file for user review if needed. In other embodiments, the filtered false SiP violations 316 can also be stored in the DRC result database 322 but are marked or flagged as false violations.

In specific, non-limiting implementations, the DRC process can be performed by a tool such as the CALIBRE NMDRC design rule checking software of Mentor Graphics Corp., and filtering can be performed by a product such as the CALIBRE YIELD SERVER software of Mentor Graphics Corp.

Figure 4A:
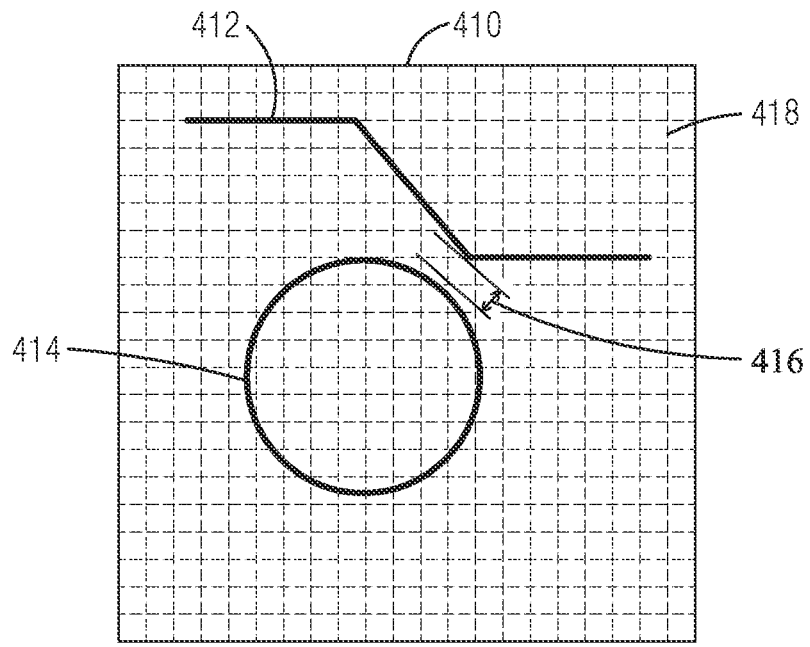
FIGS. 4A, 4B, and 4C illustrate structures in a layout design in accordance with disclosed embodiments.
Figure 4B:
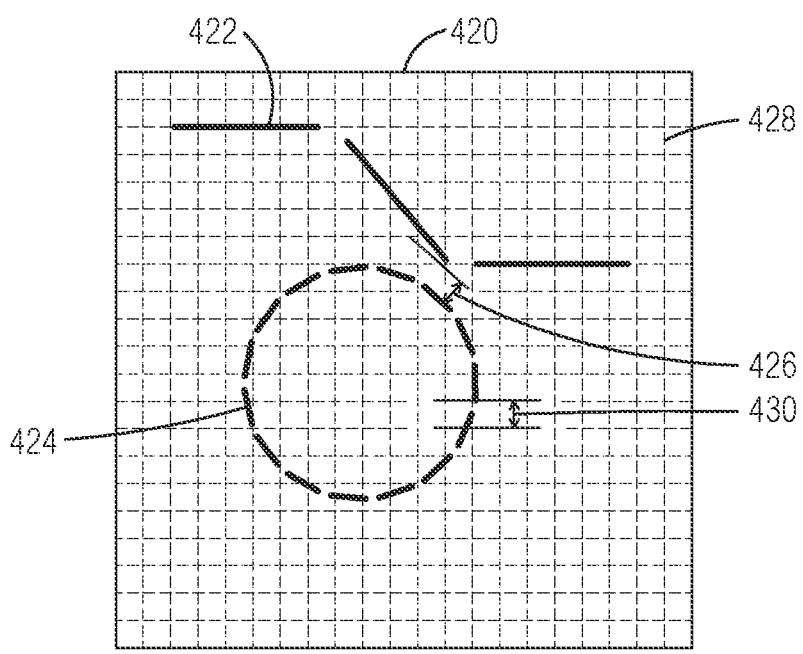
Figure 4C:
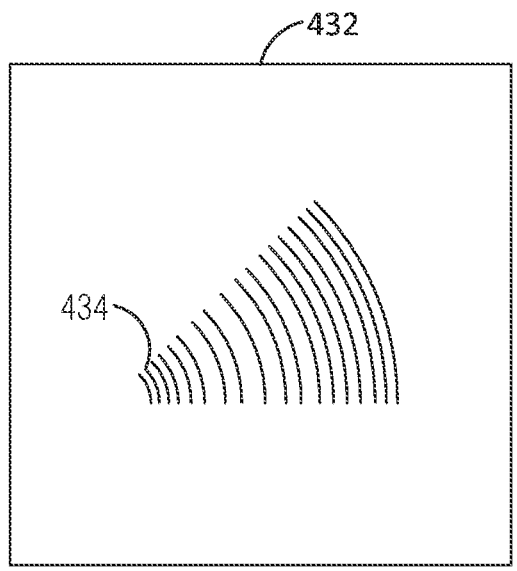

FIGS. 4A, 4B, and 4C illustrate structures in a layout design in accordance with disclosed embodiments. In FIG. 4A, a layout design 410 includes a non-Manhattan rectilinear structure 412 and includes a curved SiP structure 414, in this case a structure suitable as an optical ring resonator. During such a DRC process, the computer system may also maintain a grid 418 to track locations of the various structures. Note that, as used herein, a "curved" structure may include, in addition to actual curves, other structures that, while straight, are not conformed to a grid as described herein. For example, the tapered portion of a tapered waveguide can be considered a curved structure for the processes described herein.

In the example of FIG. 4A, rectilinear structure 412 and SiP structure 414 are separated by more than spacing constraint 416, and so should produce no spacing violations in a DRC process.

However, a typical DRC process proceeds by first attempting to align or "snap" the structures in the layout design to the grid to simplify its processing. FIG. 4B illustrates a problem caused by this process, as compared to FIG. 4A.

In FIG. 4B, a layout design 420 includes the same non-Manhattan rectilinear structure 422 as structure 412 above. SiP structure 424, however, has been modified to attempt to make it "snap" to the grid 428. Note that this is an exaggerated example for purposes of illustration.

In the example of FIG. 4B, because SiP structure 424 has been modified to snap to the grid 428, rectilinear structure 422 and SiP structure 424 are no longer separated by more than spacing constraint 426, and so will produce a spacing violation in a DRC process.

The spacing violation in FIG. 4B illustrates a false violation 316. There is no actual spacing violation, as shown in FIG. 4A, but the DRC process itself has produced a false violation by manipulating SiP structure 414 into SiP structure 424 (composed of multiple segments, in this example) in an attempt to snap the curved structure unto a grid 428.

Note, in some (but not necessarily all) processes, the DRC process can include separating the SiP structure into linear segments, and the spacing is measured between the various segments. This is illustrated in FIG. 4B, where the modified SiP structure 424 has been separated into segments before measuring, either before or after the grid-fitting process. The linear segments themselves may cause false SiP spacing violations between individual segments where the actual unsegmented SiP structure would produce no manufacturing error. As illustrated at spacing constraint 430, two of the segments of SiP structure 424 are separated by less than spacing constraint 430, and so will produce a spacing violation in a DRC process, although the actual SiP structure 424 is not segmented and so the spacing violation produced by measuring a distance between two of the segments is a false violation.

In FIG. 4C, a layout design 432 includes an SiP structure 434 that is comprised of a number of concentric arcs. A DRC process will produce many false SIP violations on such a structure, because though each arc in the structure 434 may be separated from its neighboring arcs at a distance greater than a spacing constraint along the curve of the arcs, the DRC process will find a violation because a point on one arc is less than a spacing constraint from a point on another arc in horizontal and/or vertical directions. This problem is further compounded if the arcs have been adjusted to fit a grid as in FIGS. 4A and 4B. False SiP violations as described herein include not only violations between two different structures in the design layout, but also violations between different parts of the same structure in the design layout, including linear segments of the same SiP structure if segmenting has been performed as described above.

Figure 5:
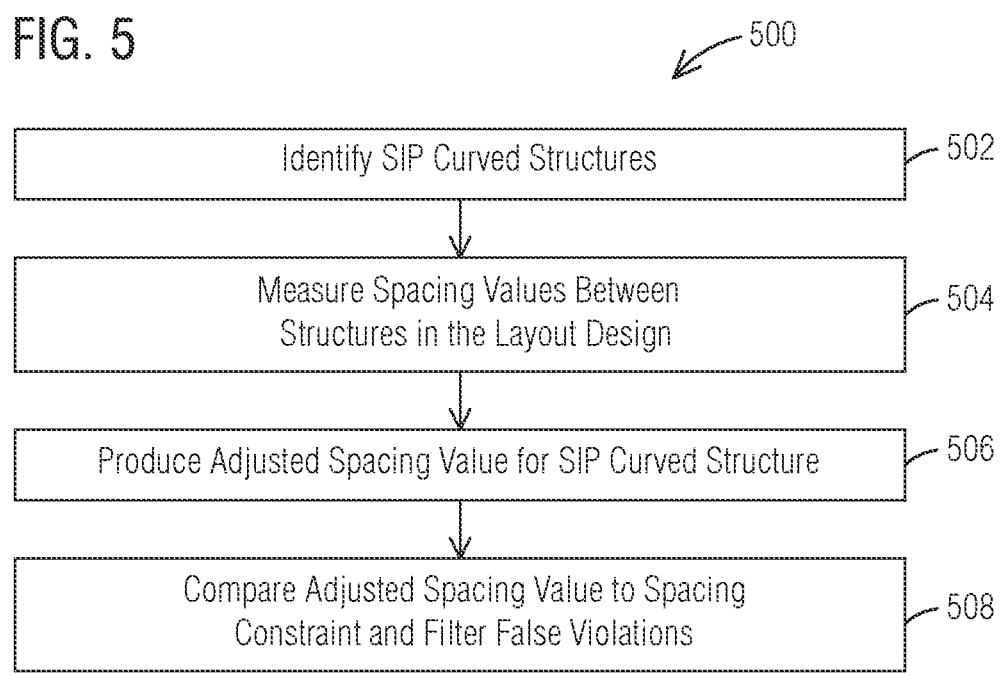
FIG. 5 illustrates a process for performing SiP spacing filtering in accordance with disclosed embodiments.

FIG. 5 illustrates a process 500 for performing SiP spacing filtering in accordance with disclosed embodiments, such as at 314 in FIG. 3.

From the DFM database 310, other storage, or layout design 306 itself, the computer system identifies SiP curved structures (502). For example, the computer system can identify the curved SiP structure 414 of FIG. 4A or can only identify the curved portions of an SiP structure 414.

The system measures spacing values between structures of the layout design (504). In a filtering operation as disclosed herein, this can be performed only at points of the SiP curves structures that have already produced a spacing violation in the DRC process.

Before performing a spacing-violation check, the system can add an additional calculated tolerance distance to the measured spacing values at the identified SiP curved structures to produce an adjusted spacing value for the identified SiP curved structures (or portion) (506). This is to compensate for the curved/skew edges being snapped to the grid and the calculated tolerance distance can be determined according to the distance a structure may be moved to snap to the grid. The calculated tolerance distance can be added to the measured spacing values to produce the adjusting spacing values at specific curved locations of the identified SiP curved structures or at specific curved locations of segmented edges of the identified SiP curved structures, where such edges have been segmented as described herein. That is, where in SiP curves structure includes both curves and straight segments, the system can produce the adjusted spacing values only at the curved segments that will be (or have been) snapped to the grid.

The system then compares the adjusted spacing values to the spacing constraint to filter the SiP violations into the true SiP violations and the false SiP violations according to the comparison (508). If the adjusted spacing value is equal to or greater than the spacing constraint at a given point, any spacing violation for that point is labeled as a false violation and can be filtered out as described above. If the adjusted spacing value is still less than the spacing constraint, then any spacing violation for that point is a true violation.

The system can thereafter perform other processes, such as displaying the true SiP violations, allowing user to cross probe them in the layout so as the user can modify the layout design to correct the true SiP violations, or controlling the manufacture of a physical chip according to the layout design, the true SiP violations, and/or the corrected true SiP violations.

Note that different embodiments can differ in minor details within the scope of the disclosure. For example, rather than a false violation being where the adjusted spacing value is equal to or greater than the spacing constraint, another embodiment may determine that a false violation is only when the adjusted spacing value is greater than (not equal to) the spacing constraint. Similarly, in other cases, instead of using an adjusted spacing value for a given measurement at a given point, the calculated tolerance distance could be subtracted from the spacing constraint at those points to produce an equivalent result.

Processes as disclosed herein result in a specific technical advantage in layout analysis, improving the operation of the computer system, by automatically identifying and filtering out false spacing violations caused by DRC checking of SiP curved structures.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form. Various process steps can be omitted, repeated, performed sequentially or concurrently with other steps or processes, or combined with other steps or processes. The features or steps disclosed herein can be combined or exchanged with others within the scope of the disclosure.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method performed by a computer system, comprising:
   receiving, by a computer system, a rule deck and a layout design, wherein the layout design includes silicon photonics (SiP) structures;
   performing, by the computer system, a verification process to produce verification results, wherein the verification results include violations and the violations include SiP violations;
   performing, by the computer system, SiP spacing filtering after performing the verification process that produced the SiP violations, wherein the SiP spacing filtering is performed by measuring spacing values between structures in the layout design, producing adjusted spacing values for curvature shapes in the SiP structures in the layout design, and separating the SiP violations into true SiP violations and false SiP violations according to a comparison between each adjusted spacing value to a spacing constraint; and
   storing the true SiP violations in a result database.

2. The method of claim 1, wherein the false SiP violations are stored separately from the true SiP violations.

3. The method of claim 1, wherein the verification results are stored in a design-for-manufacturing database.

4. The method of claim 1, wherein the violations include non-SiP violations, and wherein the computer system performs initial filtering to separate the SiP violations from the non-SiP violations.

5. The method of claim 1, wherein the SiP structures include SiP layers, and wherein the rule deck includes spacing checks for the SiP layers and does not include SiP-specific handling for the curvature shapes.

6. The method of claim 1, wherein measuring spacing values between structures in the layout design is performed at locations corresponding to the SiP violations.

7. A computer system comprising:
   a processor; and
   an accessible memory, the computer system configured to:
      receive a rule deck and a layout design, wherein the layout design includes silicon photonics (SiP) structures;
      perform a verification process to produce verification results, wherein the verification results include violations and the violations include SiP violations;
      perform SiP spacing filtering after performing the verification process that produced the SiP violations, wherein the SiP spacing filtering is performed by measuring spacing values between structures in the layout design, producing adjusted spacing values for curvature shapes in the SiP structures in the layout design, and separating the SiP violations into true SiP violations and false SiP violations according to a comparison between each adjusted spacing value to a spacing constraint; and
      store the true SiP violations in a result database.

8. The computer system of claim 7, wherein the false SiP violations are stored separately from the true SiP violations.

9. The computer system of claim 7, wherein the verification results are stored in a design-for-manufacturing database.

10. The computer system of claim 7, wherein the violations include non-SiP violations, and wherein the computer system performs initial filtering to separate the SiP violations from the non-SiP violations.

11. The computer system of claim 7, wherein the SiP structures include SiP layers, and wherein the rule deck includes spacing checks for the SiP layers and does not include SiP-specific handling for the curvature shapes.

12. The computer system of claim 7, wherein measuring spacing values between structures in the layout design is performed at locations corresponding to the SiP violations.

13. A non-transitory computer-readable medium storing with executable instructions that, when executed, cause one or more computer systems to:
   receive a rule deck and a layout design, wherein the layout design includes silicon photonics (SiP) structures;
   perform a verification process to produce verification results, wherein the verification results include violations and the violations include SiP violations;
   perform SiP spacing filtering after performing the verification process that produced the SiP violations, wherein the SiP spacing filtering is performed by measuring spacing values between structures in the layout design, producing adjusted spacing values for curvature shapes in the SiP structures in the layout design, and separating the SiP violations into true SiP violations and false SiP violations according to a comparison between each adjusted spacing value to a spacing constraint; and store the true SiP violations in a result database.

14. The non-transitory computer-readable medium of claim 13, wherein the false SiP violations are stored separately from the true SiP violations.

15. The non-transitory computer-readable medium of claim 13, wherein the verification results are stored in a design-for-manufacturing database.

16. The non-transitory computer-readable medium of claim 13, wherein the violations include non-SiP violations, and wherein the executable instructions cause the one or more computer systems to perform initial filtering to separate the SiP violations from the non-SiP violations.

17. The non-transitory computer-readable medium of claim 13, wherein the SiP structures include SiP layers, and wherein the rule deck includes spacing checks for the SiP layers and does not include SiP-specific handling for the curvature shapes.

18. The non-transitory computer-readable medium of claim 13, wherein the executable instructions cause the one or more computer systems to measure spacing values between structures in the layout design at locations corresponding to the SiP violations.

* * * * *